United States Patent
Rotenburg et al.

(10) Patent No.: US 11,890,913 B2
(45) Date of Patent: Feb. 6, 2024

(54) VEHICLE, IN PARTICULAR A MOTOR VEHICLE, COMPRISING A TEMPERATURE-CONTROL SYSTEM FOR CONTROLLING THE TEMPERATURE OF A VEHICLE INTERIOR

(71) Applicant: Bayerische Motoren Werke Aktiengesellschaft, Munich (DE)

(72) Inventors: Thomas Rotenburg, Munich (DE); Christian Rosskopf, Donauwoerth (DE); Peter Satzger, Landsberg am Lech (DE); Stefan Wiedemann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 407 days.

(21) Appl. No.: 17/298,450

(22) PCT Filed: Jan. 21, 2020

(86) PCT No.: PCT/EP2020/051318
§ 371 (c)(1),
(2) Date: May 28, 2021

(87) PCT Pub. No.: WO2020/156865
PCT Pub. Date: Aug. 6, 2020

(65) Prior Publication Data
US 2022/0032724 A1    Feb. 3, 2022

(30) Foreign Application Priority Data
Jan. 28, 2019 (DE) .................... 10 2019 102 060.3

(51) Int. Cl.
*B60H 1/00* (2006.01)
*B60N 2/56* (2006.01)
(Continued)

(52) U.S. Cl.
CPC ..... *B60H 1/00271* (2013.01); *B60H 1/00285* (2013.01); *B60H 1/00295* (2019.05);
(Continued)

(58) Field of Classification Search
CPC ............ B60H 1/00271; B60H 1/00499; B60H 1/00295; B60H 1/00285; B60H 1/00885;
(Continued)

(56) References Cited

U.S. PATENT DOCUMENTS

| | | | | |
|---|---|---|---|---|
| 6,155,492 A | * | 12/2000 | Hinterwaller | ...... B60H 1/00742 236/51 |
| 9,597,945 B2 | * | 3/2017 | Maranville | ........ B60H 1/00842 |
| 2005/0011640 A1 | * | 1/2005 | Tohda | .................... B60H 1/247 62/239 |
| 2009/0000778 A1 | * | 1/2009 | Nathan | .................... B60N 2/56 700/278 |

(Continued)

FOREIGN PATENT DOCUMENTS

| | | |
|---|---|---|
| CN | 101396953 A | 4/2009 |
| CN | 102917893 A | 2/2013 |

(Continued)

OTHER PUBLICATIONS

Chinese-language Office Action issued in Chinese Application No. 202080006676.5 dated May 15, 2023 with English translation (21 pages).

(Continued)

*Primary Examiner* — Justin M Jonaitis
(74) *Attorney, Agent, or Firm* — Crowell & Moring LLP

(57) ABSTRACT

A vehicle is provided with a temperature-control system for controlling the temperature of an interior of the vehicle. The system has a temperature-control medium, preferably a liquid temperature-control medium, guided in a temperature-control circuit. The temperature-control system is operatively connectable or operatively connected to a source (Continued)

temperature-control system such that the temperature-control medium guided in the temperature-control circuit of the temperature-control system may be thermally influenced by the source temperature-control system. The temperature-control circuit also is operatively connectable or operatively connected to at least one interior temperature-control system such that the temperature of the interior of the vehicle may be modified by the temperature-control medium in the temperature-control circuit.

28 Claims, 3 Drawing Sheets

(51) Int. Cl.
*H01M 10/625* (2014.01)
*H01M 10/63* (2014.01)
*H01M 10/66* (2014.01)

(52) U.S. Cl.
CPC ..... *B60H 1/00499* (2019.05); *B60H 1/00885* (2013.01); *B60N 2/56* (2013.01); *B60H 2001/00307* (2013.01); *H01M 10/625* (2015.04); *H01M 10/63* (2015.04); *H01M 10/66* (2015.04); *H01M 2220/20* (2013.01)

(58) Field of Classification Search
CPC ........... B60H 2001/00307; B60N 2/56; H01M 10/625; H01M 10/63; H01M 10/66; H01M 2220/20
USPC ........................................................ 165/202
See application file for complete search history.

(56) References Cited

U.S. PATENT DOCUMENTS

| | | | |
|---|---|---|---|
| 2009/0078400 A1 | 3/2009 | Tamura et al. | |
| 2013/0032307 A1* | 2/2013 | Line .................. | B60H 1/00328 165/41 |
| 2016/0325655 A1* | 11/2016 | Joshi .................. | B60N 2/5657 |
| 2017/0259642 A1* | 9/2017 | Mallek ............... | B60H 1/00371 |
| 2020/0001755 A1* | 1/2020 | Zhang ................ | B60N 2/5692 |

FOREIGN PATENT DOCUMENTS

| | | | | |
|---|---|---|---|---|
| CN | 202806288 U | 3/2013 | | |
| CN | 106687312 A | 5/2017 | | |
| DE | 1430787 A1 | 11/1968 | | |
| DE | 198 03 887 A1 | 8/1999 | | |
| DE | 102 31 395 A1 | 2/2004 | | |
| DE | 20 2005 017 225 U1 | 4/2007 | | |
| DE | 20 2018 104 055 U1 | 8/2018 | | |
| EP | 2 578 423 A1 | 4/2013 | | |
| FR | 2 839 473 A1 | 11/2003 | | |
| GB | 2475757 A * | 6/2011 | ......... | B60H 1/00271 |
| WO | WO 2013/045089 A1 | 4/2013 | | |

OTHER PUBLICATIONS

International Search Report (PCT/ISA/210) issued in PCT Application No. PCT/EP2020/051318 dated Apr. 17, 2020 with English translation (six (6) pages).
German-language Written Opinion (PCT/ISA/237) issued in PCT Application No. PCT/EP2020/051318 dated Apr. 17, 2020 (seven (7) pages).
German language Office Action issued in German Application No. 10 2019 102 060.3 dated Jan. 14, 2021 (seven (7) pages).

* cited by examiner

VEHICLE, IN PARTICULAR A MOTOR VEHICLE, COMPRISING A TEMPERATURE-CONTROL SYSTEM FOR CONTROLLING THE TEMPERATURE OF A VEHICLE INTERIOR

BACKGROUND AND SUMMARY OF THE INVENTION

The invention relates to a vehicle, in particular a motor vehicle, comprising a temperature-control system for controlling the temperature of a vehicle interior.

Corresponding vehicles with a temperature-control system for controlling the temperature of a vehicle interior are basically known from the prior art. For example, in the case of vehicles having liquid-cooled internal combustion engines, the heated coolant is used by a second heat exchanger, in addition to a first heat exchanger for the internal combustion engine, for heating the air in a vehicle interior. For this purpose, the air heated in this way is introduced into the interior of the vehicle by a fan.

The invention is based on the object of specifying a vehicle which improves the heating of the interior of a vehicle in particular in respect of a simple and rapid and also cost-effective measure, with said measure having a small structural volume and consequently requiring little space.

The object is achieved by a vehicle, in particular a motor vehicle, comprising a temperature-control system for controlling the temperature of an interior of the vehicle, having an in particular liquid temperature-control medium which is guided in a temperature-control circuit, wherein the temperature-control system is operatively connectable or operatively connected to a source temperature-control system in such a manner that the temperature-control medium guided in the temperature-control circuit of the temperature-control system can be thermally influenced by the source temperature-control system, wherein the temperature-control circuit is operatively connectable or operatively connected to at least one interior temperature-control system in such a manner that the temperature-control medium located in the temperature-control circuit enables the temperature of the interior of the vehicle to be able to be changed via at least one interior temperature-control system. The source temperature-control system and the interior temperature-control system can also be referred to in other words as source heat exchanger and interior heat exchanger. The source temperature-control system can comprise a coolant and/or heating medium or a cooling circuit and/or heating circuit. Separate media and/or a combined medium can be used as the heating medium and/or coolant, for example the temperature of the source temperature-control system can be controlled by a transfer of thermal energy, for example by the transfer of heat of an internal combustion engine which is preferably at least temporarily used for driving the vehicle. Alternatively or additionally, the temperature of the source temperature-control system can be controlled by an electric heater and/or by an electrically operated cooling system. The source temperature-control system is operatively connected to the temperature-control circuit of the temperature-control system in such a manner that thermal energy of the source temperature-control system can be output or absorbed, preferably in a controlled manner, to/from the temperature-control medium located in the temperature-control circuit. For this purpose, a transfer heat exchanger or a chiller can be arranged or formed between the source temperature-control system and the temperature-control circuit. The temperature of the interior of the vehicle is actually controlled by thermal energy being output to or absorbed from the interior of the vehicle by means of the temperature-control circuit. For this purpose, the temperature-control circuit has at least one interior temperature-control system and/or is at least operatively connected to such an interior temperature-control system such that thermal energy can be specifically transmitted between the interior of the vehicle and the temperature-control circuit of the temperature-control system by the interior temperature-control system. Owing to the fact that, for example, a liquid temperature-control medium is used in the temperature-control circuit as a means of transport for transporting the thermal energy, which is provided to the circuit by the source temperature-control system, to an interior temperature-control system, a large amount of heat can be efficiently moved within the vehicle. At the same time, the liquid lines within the vehicle can be realized with a low structural volume or low design restrictions for the interior of the vehicle. For example, the liquid temperature-control medium because of its relatively high energy density can transport heat rapidly and efficiently to or from a first location of the temperature-control circuit to a second location of the temperature-control circuit. The source temperature-control system can preferably be arranged or formed outside the passenger cell so that the available space for the configuration of the passenger cell is extended. In other words, if the temperature-control function of a temperature-control medium for controlling the temperature of an interior of a vehicle is shifted to a region of the vehicle outside the passenger cell, the source heat exchanger or the source temperature-control system can control the temperature of the temperature-control circuit to a predefined, preferably changeable, temperature level. For example, the source temperature-control system is arranged in a space region which is separated from the interior of the vehicle or in a space region which is separated from the passenger cell, for example in an engine compartment, of the vehicle and thus preferably in a vehicle region which is separated from the interior temperature-control systems. The principle of the temperature-control circuit here is preferably based on the control of the temperature of the interior of the vehicle, in particular the passenger cell, taking place by means of a liquid temperature-control medium, the temperature of which is controlled by the source temperature-control system to a temperature value, and the temperature-controlled temperature-control medium is supplied to the interior temperature-control systems by means of the temperature-control circuit. The preferable use of a liquid temperature-control medium makes it possible to provide and/or to control the temperature of the latter via a heat pump process, and thus efficiently.

It is possible for the source temperature-control system to control the temperature of the temperature-control medium transported in the temperature-control circuit to a temperature value depending on vehicle operating parameters and/or states, the external temperature and/or a desired interior temperature. Depending, for example, on the requirements, the source temperature-control system can control the temperature of the temperature-control medium to a respective, predefined temperature level.

The temperature control of the interior of the vehicle can comprise a closed and/or an open interior of the vehicle. Thus, even the interior of an open convertible, the interior forming the passenger cell, or of a vehicle having an open body design can form the vehicle interior which is described here and the temperature of which is to be controlled.

The interior temperature-control systems are preferably designed in such a manner that they permit an extensive outputting and/or absorption of thermal energy. For this purpose, for example, at least one interior temperature-control system can have a flat design.

The at least one interior temperature-control system which is linked to the temperature-control circuit and is provided for exchanging thermal energy with the interior of the vehicle can be designed as a roof temperature-control means arranged in or at a vehicle roof. A not inconsiderable part of the heating of the interior of the vehicle is produced via the vehicle roof in the event of direct sunlight. In the hot months, the heating of the vehicle interior, in particular by the sunlight, is generally undesired and the interior generally has to be cooled down. Roof temperature-control means linked to the temperature-control circuit make it possible to control the temperature of the roof, in particular to cool the latter and in particular the interior down. Circulation of the temperature-control medium can be active, for example, also or exclusively when the vehicle is stationary and/or parked. In general, a roof temperature-control means makes it possible to prevent or reduce heating of the vehicle interior, by actively cooling down the vehicle roof.

Alternatively or additionally, it can be provided that the or at least one interior temperature-control system is arranged or designed as a seat temperature-control means arranged in or at a vehicle seat. In particular for the vehicle occupants, control of the temperature of the vehicle interior via the vehicle seat provides rapidly perceptible heating and/or cooling, in particular by direct contact. Owing to the temperature in the vehicle seat being controlled via a, for example, liquid temperature-control medium, an effective change in the temperature of the vehicle seat can be achieved since a thermal exchange of energy can take place more directly and with a high level of energy density by means of the liquid temperature-control medium. The vehicle seats and/or the seat temperature-control means are connected to the temperature-control circuit, which is placed in the vehicle, via, in particular flexible, pipe and/or hose connections. The flexibility, at least in sections, of the pipe and/or hose connection for connecting the seat temperature-control means enables the position and/or the orientation of the vehicle seat to be changed without the temperature-control circuit having to be interrupted. In addition to contact transmission of thermal energy from a vehicle occupant sitting on a vehicle seat and from the seat temperature-control means, it can furthermore be advantageous if some of the thermal energy output by the seat temperature-control means can be at least partially absorbed by an air flow moved via a flow system, which is provided in particular on the vehicle seat side, and/or can be output by an air flow. In other words, the seat temperature-control means at least partially heats or cools an air flow which is conveyed via a flow system and can be used for controlling the temperature of the interior of the vehicle. For example, the temperature-controlled air flow can involve neck heating which can be supplied specifically at least in sections to a neck region of at least one vehicle occupant. Alternatively or additionally, the temperature-controlled air flow can be supplied to a knee region which is arranged behind and/or next to the vehicle seat which comprises the seat temperature-control means controlling the temperature of the air flow.

It is also possible that the or at least one interior temperature-control system is designed as an interior trim temperature-control means arranged or formed in or at an interior trim panel of the vehicle. An interior trim panel can be, for example, a door interior trim, a vehicle pillar interior trim, or a part forming part of a center console or of a dashboard at least in sections. For example, the interior trim temperature-control means can control the temperature of the interior of the vehicle not only by in particular extensive thermal transmission of energy to the air of the interior, but optionally can be arranged or formed in such a manner that, for example, the temperature of a drinks holder and/or of a glove compartment can be controlled, and therefore, for example, the temperature of a vessel which is located in a drinks holder and is filled with a drink and/or of an object stowed in the glove compartment can be controlled.

It can optionally also be expedient if the or at least one interior temperature-control system is designed as a floor temperature-control means arranged or formed in or at a floor section of the vehicle. The arrangement on the vehicle floor permits simple integration of an interior temperature-control means, which is preferably extensively effective or is of flat design, in a vehicle. The temperature control in the floor region is also advantageous since, for example, heating takes place in the vicinity of the feet and/or legs of the vehicle occupants and this permits the temperature of the interior of the vehicle to be controlled in a manner which is perceptible at an early point by the vehicle occupants and/or is at least subjectively rapidly effective for a vehicle occupant.

Furthermore, it is possible that the or at least one interior temperature-control system is designed as at least one air conditioning device which at least temporarily controls the temperature of an air flow directed into the vehicle interior, preferably at least one outlet opening of the air flow is arranged in the region of the front vehicle seats of the interior. The air conditioning device can be thermally operatively connected, for example, directly to the source temperature-control system, and/or can be designed in such a manner that it itself can provide cooling, for example via a cooling element, and/or heating, via a heating element. The air conditioning device can be configured, for example, in such a manner that it has a heating and/or cooling power of at maximum 6 kW, in particular of at maximum 4.5 kW. Alternatively or additionally, the air conditioning device can be present in a manner decoupled from the temperature-control circuit, i.e. no thermal-energy-transmitting connection of the air conditioning device to the temperature-control circuit or to the at least one interior temperature-control system is provided. Since the temperature of the interior is also or at least temporarily at least predominantly controlled via the at least one interior temperature-control system of the temperature-control system, the capacity of the air conditioning device can thus be weakly dimensioned. An air conditioning device, the heat and/or cold power of which is dimensioned to be so small or weak, can be realized in a small or low-volume design and consequently simply integrated or installed in a vehicle concept. For example, the air conditioning device can serve, for example, for defrosting or deicing and/or for thawing or air drying of the windshield, in particular the inner surface of the windshield. The exclusive and/or predominant control of the temperature of the interior or of the passenger cell can take place via the temperature-control system or the at least one interior temperature-control system. The air conditioning device can use, for example at least temporarily, fresh air sucked up from outside the vehicle and/or recirculation of air already located in the interior of the vehicle, via a recirculating air mode, for controlling the temperature of an air flow flowing out via the outlet openings. The at least one outlet opening of the air conditioning device can be arranged or formed in such a manner that said outlet opening is placed in the region of the front vehicle seats, in particular in front of the front vehicle seats in the direction of travel.

The temperature-control circuit can comprise at least one connecting line to and/or from an interior temperature-control system, said connecting line running at least in sections in or at a vehicle component, that is to say, for example, that the connection is integrated at least in sections in a vehicle component, for example is designed as part of the vehicle component. The connecting line can run, for example, at least in sections in a region of a vehicle body and/or in a space surrounded by a load-bearing vehicle body and/or an interior trim panel.

It is thus possible, for example, that at least one connecting line of the temperature-control circuit to and/or from an interior temperature-control system, in particular to and/or from a roof temperature-control means, runs at least in sections through a vehicle pillar, in particular through an A, B or C pillar of the vehicle. Owing to the fact that a preferably liquid temperature-control means circulates in the temperature-control circuit, it is possible, because of the high level of energy density of the liquid temperature-control medium, to design the connecting lines with small cross sections such that they can be arranged or formed even in a vehicle pillar. In this connection, both a forward line and a return line of the temperature-control circuit to at least one roof temperature-control means arranged in a roof region can be placed within the same vehicle pillar. Alternatively, the forward line can be arranged in a first vehicle pillar and the return line in a second vehicle pillar different from the first one, for example in two different A pillars of the vehicle.

It is possible that the or at least one interior temperature-control system is operatively connected to at least one open or closed air-conducting duct, which runs in particular at least in sections in a vehicle pillar (e.g. an A, B, C and/or D pillar), in such a manner that thermal energy can be transmitted between the medium guided in the air-conducting duct and the interior temperature-control system. For example, an air-conducting duct for guiding air for controlling the temperature of the interior can be guided through a vehicle pillar and then opens at an air outlet opening arranged in the vehicle pillar. An air flow which is guided in the air-conducting duct, as it flows through the air-conducting duct, can output heat to the interior temperature-control system or can absorb heat from the interior temperature-control system and can consequently be cooled or heated. A closed air-conducting duct can be designed to be closed at least in sections over its circumference, that is to say, for example, that the medium guided in the air-conducting duct cannot escape (radially) from the air-conducting duct at least in sections. By contrast, a channel which is open at least in sections can have a, for example, U shape in which an air flow is directed in a predefined direction.

In an advantageous embodiment, at least two interior temperature-control systems are arranged in series in the temperature-control circuit, with, in the direction of flow (a) a floor temperature-control means arranged upstream of a roof temperature-control means, a seat temperature-control means and/or an interior trim temperature-control means, (b) a roof temperature-control means arranged upstream of a seat temperature-control means and/or an interior trim temperature-control means, and/or (c) a seat temperature-control means arranged or formed upstream of an interior trim temperature-control means. The predetermined sequence of the interior temperature-control systems makes it possible, for example, for the interior temperature-control system which is most relevant to the subjective sensation of heat and/or cold by a vehicle occupant to be loaded first and therefore with most of the thermal energy by the temperature-control circuit and/or to have the greatest gradient of the effective thermal change at the beginning of the temperature-control action. The air conditioning device can be linked to the temperature-control circuit. If the air conditioning device is linked to the temperature-control circuit, it is preferably arranged upstream, in the direction of flow, of the remaining interior temperature-control systems of the temperature-control circuit, i.e. as the first means downstream of the action point of the source temperature-control system in the temperature-control circuit since the air conditioning device can have the greatest temperature differences. Alternatively or additionally, the interior temperature-control systems which are highly effective for a rapid change in the actual temperature to a desired temperature of the interior of the vehicle can be arranged in sequence upstream of the interior temperature-control systems which are less effective. In this approach, the circuit of the temperature-control circuit or the flow of the temperature-control medium begins at the transfer point of the thermal energy from the source temperature-control system into the temperature-control circuit.

It can be expedient if at least two interior temperature-control systems are arranged in series in a temperature-control circuit, wherein a sequence and/or an amount of flow of the temperature-control medium through the at least two interior temperature-control systems can be changed via at least one control means which can be activated by means of a control system, preferably at least one interior temperature-control system can be uncoupled at least temporarily or can be bypassed at least temporarily from the circuit of the temperature-control medium, in particular via a bypass line. For example, it can be expedient that if a plurality of vehicle seats equipped with a respective interior temperature-control system, in particular seat temperature-control means, can be selectively temporarily decoupled from the temperature-control circuit, vehicle seats for example temporarily not used by a vehicle occupant can be removed from the temperature control of the vehicle interior in order to provide the thermal energy of the temperature-control circuit to the other interior temperature-control systems located in the temperature-control circuit. The control means can be designed, for example, as an electronically or electrically activatable valve, for example as a rotary slide.

It is possible that the temperature-control circuit can be connected to at least one temperature-control-medium storage system in such a manner that at least a partial amount of the temperature-control medium can be transferred at least temporarily from the temperature-control circuit into the temperature-control-medium storage system and/or from the temperature-control-medium storage system into the temperature-control circuit. For this purpose, the temperature-control circuit can be operatively connected to a pump and to a control means such that, for example, a temperature-control medium located in the temperature-control circuit can be transferred or conveyed into the temperature-control-medium storage system. For example, the temperature-control circuit can comprise a valve which opens at a predefined negative pressure, and therefore an at least partial emptying of the temperature-control circuit by the temperature-control medium is permitted since the temperature-control medium can be pumped off into the temperature-control-medium storage system and, because of the negative pressure in the temperature-control circuit, the opening valve sucks up ambient air into the temperature-control circuit.

Furthermore, the temperature-control-medium storage system can have a first reservoir for at least temporarily storing a first temperature-control medium and a second reservoir for at least temporarily storing a second temperature-control medium which is different from the first temperature-control medium, preferably the first and/or the second temperature-control medium can be transferred at least temporarily into the first reservoir, into the second reservoir and/or into the temperature-control circuit via at least one control means which can be activated by means of a control system. For example, the first reservoir can contain a liquid temperature-control medium and the second reservoir a gaseous temperature-control medium, wherein the gaseous temperature-control medium does not necessarily have to have a property which can substantially transport thermal energy. That is to say, for example, that a gaseous temperature-control medium at least temporarily reduces the storage capability of thermal energy in the temperature-control circuit. An exemplary application in this regard can be when a vehicle is parked in direct sunlight in summer. Normally, the temperature-control medium located, for example, in the roof region would heat up and absorb the thermal energy of the sunlight and therefore would heat up the vehicle as a whole. If, in this case, a gaseous temperature-control medium now replaces the liquid temperature-control medium at least in sections in the temperature-control circuit, no such large amount of heat can be absorbed or stored by the temperature-control circuit. Consequently, the vehicle and in particular the interior of the vehicle can subsequently cool down more rapidly since less heat is stored in the vehicle. It can be expedient, for example, for an exchange of a liquid temperature-control medium by a gaseous temperature-control medium in the temperature-control circuit to be able to be carried out by activation of a control means and/or of a valve, wherein the activation can be as a function of a vehicle occupant temperature requirement, an external temperature, an interior temperature, a loading state of the energy store of the vehicle, a filling level of a fuel tank, an operating state of the vehicle (in particular driving state: brief stop, stopping, parking). The temperature-control-medium storage system can also be used to at least temporarily pre-condition the temperature-control medium located there, even during parking of the vehicle. That is to say, for example, that a requirement signal activates, preferably the source temperature-control system, in such a manner that the temperature-control medium located in the temperature-control-medium storage system is heated or cooled in order, in a temporally later phase, to permit more rapid heating up or cooling of the interior of the vehicle. The requirement signal can be generated, for example, by an approach recognition of a transmitter and/or of a person taking place in particular via wireless contact or via a camera-based visual detection.

It can optionally be expedient if the temperature of the temperature-control medium contained in the temperature-control circuit can be controlled, at least temporarily, via at least one, in particular electrically operated, temperature-control element. The temperature-control element can be, for example, a heating wire which temporarily heats up the temperature-control medium flowing in a temperature-control circuit section. Owing to the fact that an additional temperature control can take place, it is made possible for heat to be rapidly provided, at least in regions, within the interior of the vehicle. For example, such a temperature-control element can compensate for a certain inertia of the temperature-control circuit and the source temperature control thereof by means of the source temperature-control system. If the temperature-control circuit passes into its predetermined operating state, the temperature-control element can be deactivated if the temperature requirement for the interior of the vehicle can also be maintained via the temperature-control circuit and optionally the air conditioning device. In order also to assign a cooling or heat-absorbing function to the temperature-control element, it can be expedient to design the temperature-control element as a Peltier element. A possibly undesired change in temperature at a partial region of the correctly operating Peltier element can thus be compensated in that said partial region is thermally operatively connected to at least one interior temperature-control system and/or to another body which is effective as a heat exchanger and through which the temperature-control medium flows, and therefore the undesired thermal change at the partial region of the Peltier element can be absorbed by the temperature-control medium and transported away and consequently compensated for.

It is possible that at least one flow element is arranged or formed in the temperature-control circuit, the flow element at least temporarily changing the flow properties of the temperature-control medium at least in sections, in particular the flow element can be activated by means of a control system in such a manner that a flow resistance and/or a manner of flow and/or a volumetric flow and/or a flow rate of the temperature-control medium guided in the temperature-control circuit can be changed at least in sections. Owing to the fact that, for example, the manner of flow within a section of the temperature-control circuit can be changed in a specific manner, the effect can be achieved that the temperature-control medium remains in the corresponding sections for a longer time and consequently can act there for longer. Also, by means of a targeted change of the effect of the flow elements on temperature-control medium flowing past or through, a flow resistance for said line section can be changed. In the case of line sections arranged in parallel, the volumetric flow arising in at least two line sections running in parallel can be set.

In a further optional embodiment, it is provided that the vehicle has at least one first and one second temperature-control circuit, wherein the first and the second temperature-control circuit are operatively connected at least temporarily to the same and/or to different interior temperature-control systems, preferably at least one interior temperature-control system can be connected to and/or disconnected from the first and/or the second temperature-control circuit via at least one control means which can be activated by means of a control system. The first and the second temperature-control circuit can be present separated, in particular completely, from each other and optionally selectively temporarily connected or separated at intersecting points provided with valves. The provision of two temperature-control circuits makes it possible to use a first temperature-control medium in a first temperature-control circuit and a temperature-control medium which is different from the first temperature-control medium in a second temperature-control circuit. The same temperature-control medium can also flow through both temperature-control circuits, wherein a first temperature-control circuit can be used, at least temporarily, for a first group of interior temperature-control systems and the second temperature-control circuit for a second group of interior temperature-control systems different from the first group of interior temperature-control systems.

Temperature-control requirement information can be transmissible to a control system via an optional input unit, wherein the control system can generate a control signal, which corresponds to the temperature-control requirement information or is dependent on the temperature-control requirement information, for activating the temperature-control system, in particular for activating at least one control means of the temperature-control circuit and/or for activating the source temperature-control system. The input unit preferably comprises a wireless connection of an input means to the control system. For example, a person can use a mobile device to transmit temperature requirement information to a control system, for example the requirement for a desired temperature for the interior of the vehicle. The control system activates the temperature-control system here in such a manner that the temperature-control medium flowing in the temperature-control circuit and the associated transmission of thermal energy via the interior temperature-control systems into the interior of the vehicle control the temperature to the desired temperature. The input unit can be designed, for example, as a mobile electronic device or as an electronic mobile device and can be designed, for example, as a smartphone, tablet and/or portable computer (e.g. laptop). In principle, it is also possible for an approach of a person to a vehicle to be detected (for example via GPS information of a transmitter carried by the person, for example the vehicle key) and, as soon as the person is in a predefined vicinity of the vehicle, the control system initiates the temperature control of the interior of the vehicle to a desired temperature. Alternatively or additionally, it can be expedient for the temperature-control requirement information to initially act, via the control system, on the source temperature-control system in such a manner that the latter switches into a preparatory state for the, preferably temporally offset, specific temperature control of the temperature-control circuit. The effect can thus be achieved, for example, that the source temperature-control system switches into a preconditioned state in order to have a more rapid temperature-controlling effect on the temperature-control circuit at a later time. The temperature-control circuit can also be preconditioned since, in particular when a liquid temperature-control medium is used, the latter has a power density which makes it effectively possible to transmit a sufficient amount of thermal energy within a short time. The temperature-control medium used can be, for example, water and/or a water-glycol mixture.

In order to more rapidly influence the temperature of the interior of the vehicle, the influence being perceptible in particular subjectively for a vehicle occupant, it can optionally be advantageous if the vehicle comprises at least one electrically operated or operable radiant heating means, the predominant heat output of which takes place in the form of heat radiation into the interior of the vehicle. These radiant heating media supplement the temperature-control option of the interior. For example, the heat radiation output by one radiant heating means is directed into a footwell of at least one seat. For this purpose, a radiant heating means can be arranged, for example, in or at the backrest or in the bending region between seat surface and backrest of a vehicle seat such that the knee or foot region located behind this vehicle seat can be acted upon with the heat radiation output by the radiant heating means.

It is possible that the temperature-control circuit comprises at least one valve means which can be used to at least temporarily open and/or close the temperature-control circuit to/from the environment, preferably the valve means is arranged or formed in the region of the vehicle roof. Venting of the temperature-control circuit provided with a liquid temperature-control medium can take place by means of the valve means. In particular if the temperature-control medium is intended to be partially or completely pumped out of the temperature-control circuit into a storage system, ambient air can pass into the temperature-control circuit through the valve means. The valve means is arranged or formed, for example, in or at the roof temperature-control means. The arrangement of the valve means in the upper region of the vehicle, for example in the vehicle roof, permits a reliable manner of action of the valve means in the event of the venting of the temperature-control circuit. In particular whenever ambient air is intended to at least temporarily penetrate the temperature-control circuit via the valve means, it can prove to be advantageous to provide the valve means with an air filter in order to prevent contaminants in the air from penetrating the temperature-control circuit. The valve means can be transferrable into an open position and/or into a closed position by activation of an adjustment means by a control system. Alternatively or additionally, the valve means is designed in such a manner that automatic opening and/or closing of the temperature-control circuit can be carried out. This can take place, for example, by a valve means which is dependent on negative pressure and/or positive pressure and at which a predefined pressure limit value has to be present in order to reach an open position and/or closed position.

In addition to the control of the temperature of the interior of the vehicle, the temperature-control medium guided in the temperature-control circuit can be connectable at least temporarily to a temperature-control means or to a further heat exchanger means, wherein the temperature-control means controls the temperature of at least one vehicle component. In particular, the temperature of a vehicle control device, a drinks holder, a glove compartment and/or an energy store can be controlled by the temperature-control means. Owing to the fact that the temperature-control circuit additionally also controls the temperature of, for example, a vehicle control device, a drinks holder (also called cup holder), a glove compartment and/or an energy store of the vehicle, in addition to controlling the temperature of the interior of the vehicle the temperature-control system can also take on further temperature-controlling tasks. In this connection, it can be expedient that, in different operating states of the vehicle, a different ranking can be predetermined or is predetermined for providing thermal energy for the respective tasks (controlling the temperature of the interior of the vehicle, the vehicle control device, the drinks holder, the glove compartment and/or the energy store) on the basis of the temperature-control system, and the respective temperature-control means can be supplied with thermal energy according to the ranking. The energy store of the vehicle can be designed, for example, as a high voltage store for an at least temporarily electrically drivable vehicle and/or for a vehicle which can be operated at least temporarily in an at least semi-autonomous driving mode.

The temperature-control-medium storage system can be, for example, in particular directly, operatively connected to the source temperature-control system, wherein thermal energy can be transmitted between the source temperature-control system and the temperature-control medium located in the temperature-control-medium storage system. Alternatively or additionally, the temperature-control-medium storage system can be equipped with a, preferably electrically operated, temperature-control element which permits control of the temperature of the temperature-control medium located in the temperature-control-medium storage system.

In order to rapidly and efficiently achieve a specific control of the temperature of the interior of the vehicle to a desired temperature, it can be provided that at least one viewing window, in particular all of the viewing windows, of the vehicle is or are designed as a viewing window reflecting infrared light, preferably at least one viewing window, in particular a windshield, of the vehicle is equipped with a heating means. A viewing window should be understood as meaning the windows of a vehicle permitting a view for a vehicle occupant to the outside of the passenger cell and at the same time protecting the vehicle occupant from wind, weather and particles in the air flow.

It is possible to provide the temperature-control circuit as an essentially single measure heating and/or cooling the interior of the vehicle. In this optional case, further heating and/or cooling elements for the specific control of the temperature of the interior of the vehicle can be omitted.

The temperature-control system mentioned here can preferably be used in a vehicle which can be driven at least temporarily with an electric machine, in particular with an electric motor, and/or which is designed as a vehicle which can be operated at least temporarily in an autonomous or semi-autonomous driving mode. The temperature-control circuit operated with a liquid temperature-control medium, and the possibility of preconditioning the temperature-control medium make it possible for high thermal amounts of energy to be able to be provided within the vehicle in an efficient manner. This reduces the energy consumption of the vehicle and even the reserves of electrical energy which are carried along or can be provided in the vehicle.

In addition to the vehicle comprising a temperature-control system for controlling the temperature of a vehicle interior, the invention also relates to a temperature-control system for a vehicle, in particular a vehicle described here, wherein the temperature-control system is operatively connectable or operatively connected to a source temperature-control system such that a temperature-control medium guided in a temperature-control circuit of the temperature-control system can be thermally influenced by the source temperature-control system, wherein the temperature-control circuit is operatively connectable or operatively connected to at least one interior temperature-control system in such a manner that the temperature-control medium located in the temperature-control circuit enables the temperature of an interior of a vehicle equipped with the temperature-control system to be able to be changed via the temperature-control system. Finally, the invention also relates to a method for controlling the temperature of an interior of a vehicle, comprising a vehicle described here or a temperature-control system described here.

All of the advantages, details, embodiments and/or features of the vehicle according to the invention can be transferred or applied to the temperature-control system according to the invention and/or to the method according to the invention.

The invention is explained in more detail with reference to exemplary embodiments in the drawings

DETAILED DESCRIPTION OF THE DRAWINGS

Figure 1:
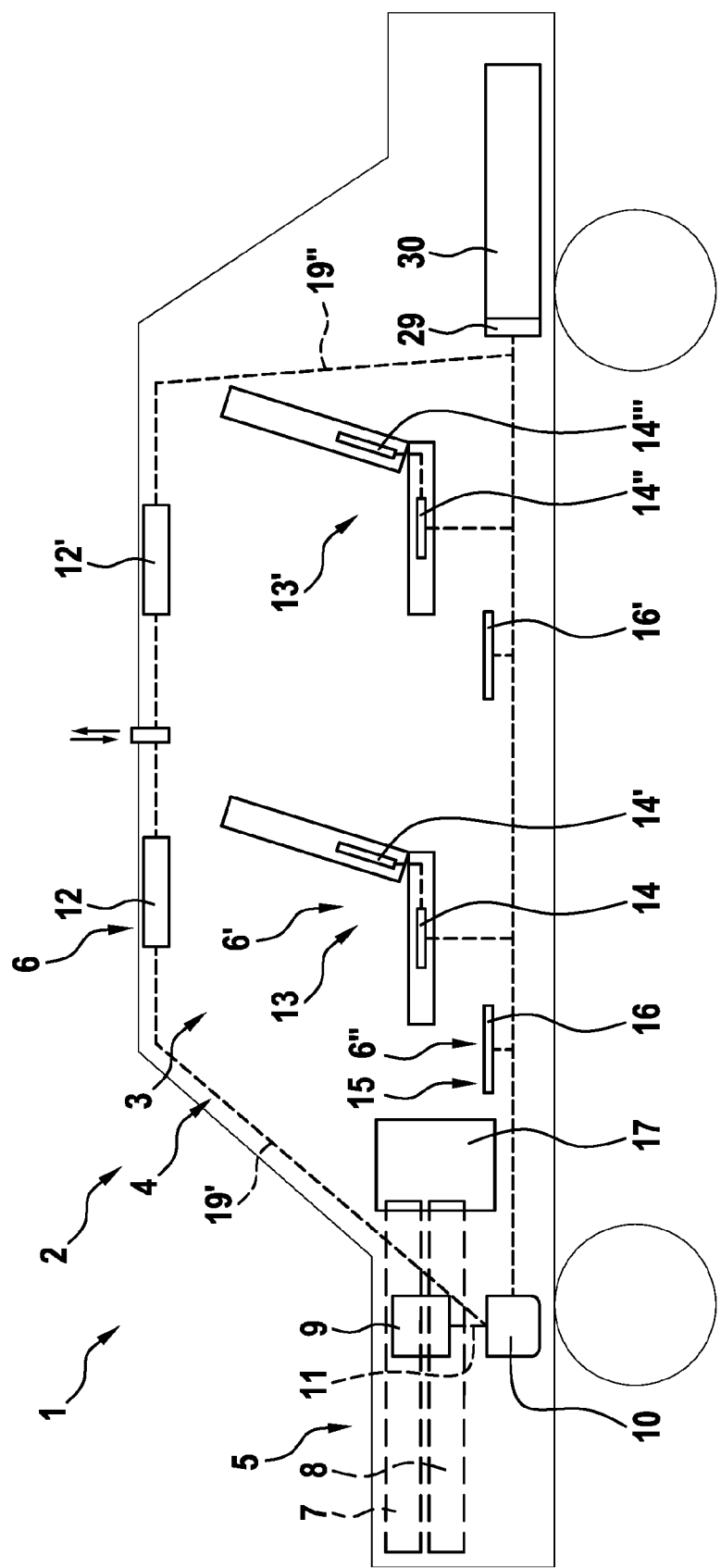
FIG. 1 shows a schematic illustration of a vehicle comprising a temperature-control system according to an embodiment of the present invention.

FIG. 1 shows a schematic illustration of a vehicle 1, in particular a motor vehicle, comprising a temperature-control system 2 for controlling the temperature of an interior 3 of the vehicle 1, having an, in particular liquid, temperature-control medium which is guided in a temperature-control circuit 4, wherein the temperature-control system 2 is operatively connectable or operatively connected to a source temperature-control system 5 in such a manner that the temperature-control medium guided in the temperature-control circuit 4 of the temperature-control system 2 can be thermally influenced by the source temperature-control system 5, wherein the temperature-control circuit 4 is operatively connectable or operatively connected to at least one interior temperature-control system 6, 6', 6" in such a manner that the temperature-control medium located or conveyed in the temperature-control circuit 4 enables the temperature of the interior 3 of the vehicle 1 to be changed via the temperature-control system 6, 6', 6". The source temperature-control system 5 can comprise a heating and/or cooling circuit 7, 8 which exchanges or transmits thermal energy between the source temperature-control system 5 and the temperature-control circuit 4 via a transmission heat exchanger 9 or via a chiller and a connection 11. According to the embodiments shown in FIGS. 1 and 2, the transmission heat exchanger 9 is operatively connected via a thermally effective connection 11 to a temperature-control-medium storage system 10 forming part of the temperature-control circuit 4. The temperature-control circuit 4 can comprise a pump (not illustrated) or circulating pump for the, preferably circulating, conveying of the, in particular liquid, temperature-control medium contained in the temperature-control circuit 4.

The vehicle 1 is equipped with, for example, two interior temperature-control systems 6, 6', 6" which are arranged or formed in the roof region of the vehicle 1 and are configured as roof temperature-control means 12, 12'. The roof region provides a good option for an extensive configuration or arrangement of the roof temperature-control means 12, 12', thus permitting effective control of the temperature of the interior 3. The interior temperature-control system 6, 6', 6" can also be designed in the form of at least one seat temperature-control means 14, 14', 14", 14''' arranged in or at a vehicle seat 13, 13'. A flow system (not illustrated) can also be arranged in or at the vehicle seat 13, 13' in such a manner that thermal energy of the seat temperature-control means 14, 14', 14", 14''' can be at least partially absorbed and/or output for an air flow moved by means of the flow system. An individual vehicle seat 13, 13' or all of the vehicle seats 13, 13' of a vehicle 1 can comprise at least one seat temperature-control means 14, 14', 14", 14''' in its/their seat surface and in its/their backrest. The or at least one interior temperature-control system 6, 6', 6" can optionally be additionally designed as an interior trim temperature-control means (not illustrated) arranged or formed in or at an interior trim panel (not illustrated) of the vehicle 1. Additionally or alternatively, the or at least one interior temperature-control system 6, 6', 6" can be arranged or designed as a floor temperature-control means 16, 16' arranged or formed in or at a floor section 15 of the vehicle 1. The floor or the floor section 15 of the vehicle 1 affords the possibility of configuring an interior temperature-control system 6, 6', 6" extensively and thus of extensively and effectively transmitting heat and/or cold from the temperature-control circuit 4 into the interior 3 of the vehicle 1.

The vehicle 1 can comprise an air conditioning device 17 which is thermally connected to the source temperature-control system 5, in particular the air conditioning device 17 is operatively connected, for example directly, to the heating and/or cooling circuit 7, 8 of the source temperature-control system 5. An, in particular direct, linking of the air conditioning device 17 to the temperature-control circuit 4 is not provided here, i.e. the temperature-control medium does not flow through the air conditioning device 17, cf. FIG. 1. The main task of the air conditioning device 17 can be to permit defogging and/or deicing, in particular of the windshield, of the vehicle 1 and/or air drying in the interior 3 of the vehicle 1. For this purpose, the temperature of an air flow 18, 18' directed into the interior 3 of the vehicle 1 can be controlled by the air conditioning device 17. The air flow 18, 18' can be conveyed, for example, by a fan arranged in the air conditioning device 17. The outlet opening (not illustrated) of the air flow 18, 18' is arranged or formed preferably in the region of the front vehicle seats 13. In particular, the outlet openings can be arranged or formed in front of the front vehicle seat 13 in the direction of travel.

Figure 2:
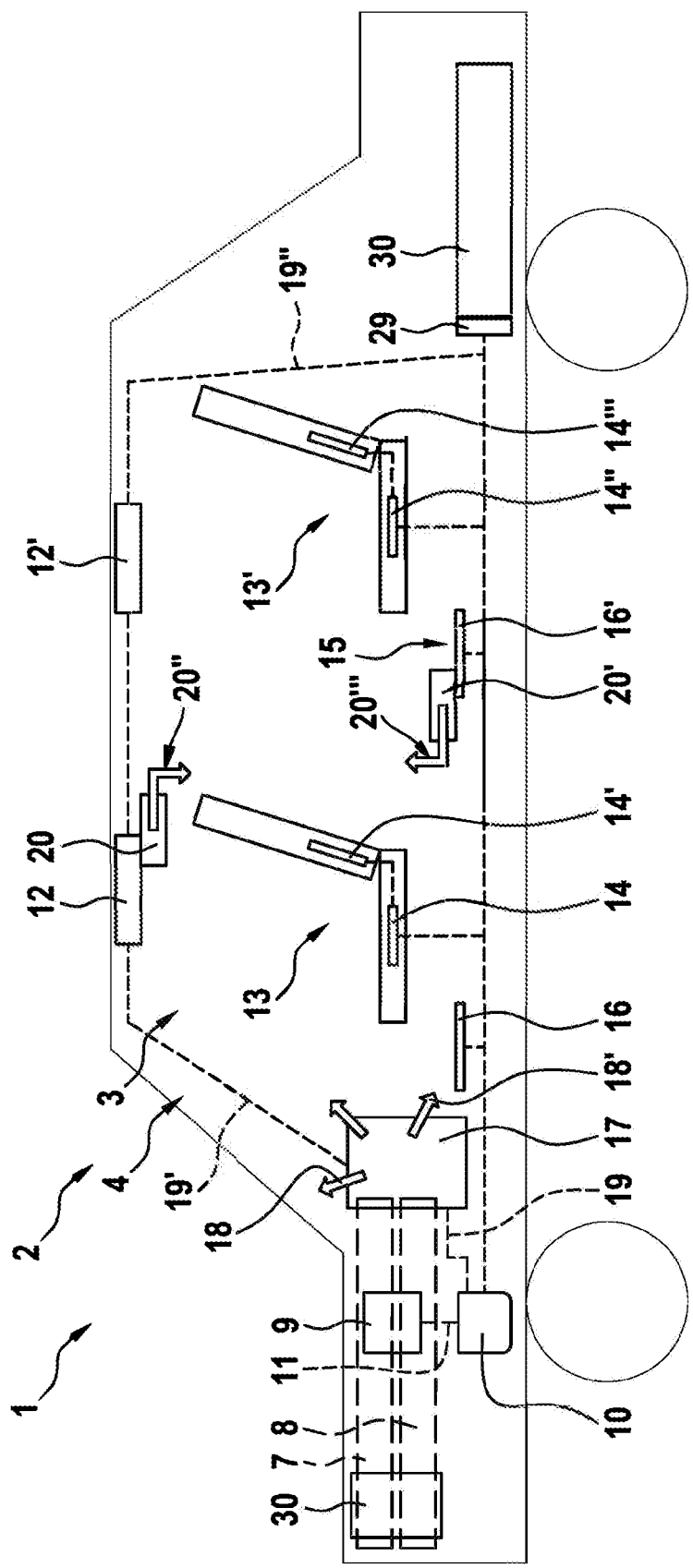
FIG. 2 shows a schematic illustration of a vehicle comprising a temperature-control system according to a further embodiment of the present invention.

According to the embodiment shown in FIG. 2, the air conditioning device 17 can alternatively or additionally be linked to the temperature-control circuit 4 via connecting lines 19, 19'. An additional control of the temperature of the air conditioning device 17 by the source temperature-control device 5 or by the heating and/or cooling circuit 7, 8 thereof can be provided—as illustrated—but is not absolutely necessary.

At least one connecting line 19, 19', 19'' of the temperature-control circuit 4 to and/or from an interior temperature-control system 6, 6', 6'' runs at least in sections in or at a vehicle component. For example, a connecting line 19, 19', 19'' runs at least in sections in a region of a vehicle body (not illustrated) and/or in a space surrounded by a load-bearing vehicle body and/or an interior trim panel (not illustrated). According to FIG. 3, the connecting lines 19', 19'' of the temperature-control circuit 4 to and/or from a roof temperature-control means 12, 12' run at least in sections through a vehicle pillar, in particular through an A and a C pillar of the vehicle 1. In this connection, a supply connecting line and a removal connecting line of at least one roof temperature-control means 12, 12' connected to the temperature-control circuit 4 can run at least in sections through a single vehicle pillar or through two different vehicle pillars.

According to the embodiment shown in FIG. 2, it can be provided that the or at least one interior temperature-control system 6, 6', 6'' is operatively connected to at least one open or closed air-conducting duct 20, which runs in particular at least in sections in the A, B and/or C pillar, in such a manner that thermal energy can be transmitted between the medium guided in the air-conducting duct 20 and the interior temperature-control system 6, 6', 6''. In the example illustrated, a first air-conducting duct 20 is arranged or formed in the roof region and a second air-conducting duct 20' in the floor section 15 of the vehicle 1. The first air-conducting duct 20 is thermally operatively connected to a roof temperature-control means 12, and the second air-conducting duct 20' is thermally operatively connected to a floor temperature-control means 16'. The medium 20'', 20''' guided at least in sections by the respective air-conducting ducts 20, 20', or the guided air flows are directed into the interior 3 and accelerate the temperature control of the interior 3 by the temperature-control system 2. The air-conducting ducts 20, 20' can optionally be equipped with flow means or with fans conveying the medium 20'', 20'''. In this sense, the air masses which are optionally arranged or formed in a vehicle seat 13, 13' and are optionally moved by means of a flow means (not illustrated) also constitute a medium 20'', 20''' which is guided in an air-conducting duct 20, 20'.

The at least two interior temperature-control systems 6, 6', 6'' can be arranged in series in the temperature-control circuit 4, with, preferably in the direction of flow (a) a floor temperature-control means 16, 16' arranged or formed upstream of a roof temperature-control means 12, 12', a seat temperature-control means 14, 14', 14'', 14''' and/or an interior trim temperature-control means, (b) a roof temperature-control means 12, 12' arranged or formed upstream of a seat temperature-control means 12, 12' and/or an interior trim temperature-control means, and/or (c) a seat temperature-control means 14, 14', 14'', 14''' arranged or formed upstream of an interior trim temperature-control means. If an air conditioning device 17 is linked in series to the temperature-control circuit 4, the air conditioning device can be arranged as the first means in the direction of flow which is passed through by the temperature-control medium, after the temperature of the latter has been controlled by the source temperature-control system 5, or is in thermal contact.

Figure 3:
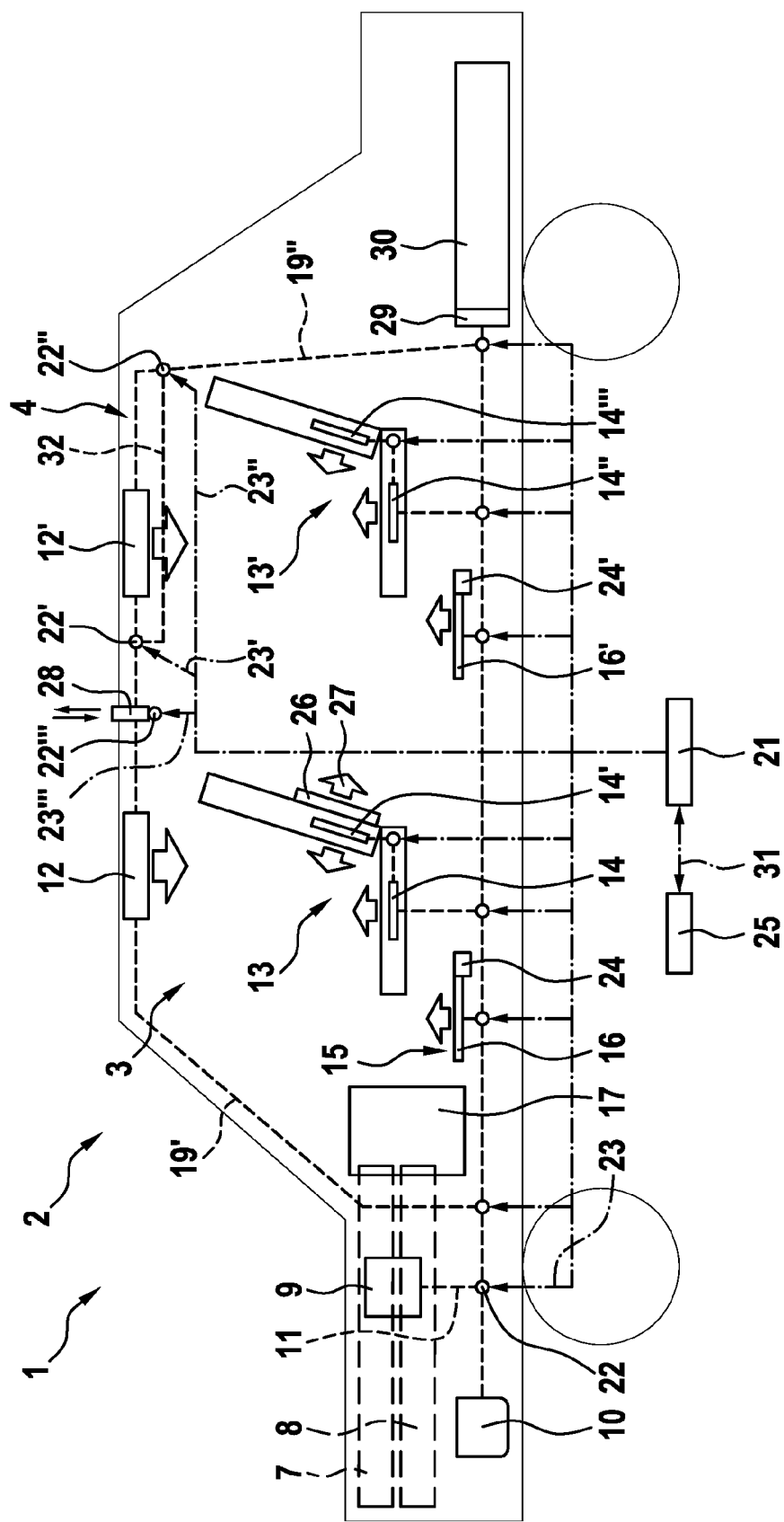
FIG. 3 shows a schematic illustration of a vehicle comprising a temperature-control system according to a further embodiment of the present invention.

In the embodiment shown in FIG. 3, at least two interior temperature-control systems 6, 6', 6'' are arranged in series in a temperature-control circuit 4, wherein a sequence and/or an amount of the flow of the temperature-control medium through the at least two interior temperature-control systems 6, 6', 6'' and/or in a temperature-control circuit section can be changed via at least one control means 22, 22', 22'', 22''' which can be activated by means of a control system 21. For example, at least the second roof temperature-control means 12' can be "decoupled" from the temperature-control circuit 4 by corresponding activation of the control means 22', 22'' such that the temperature-control medium can be conducted past the second roof temperature-control means 12' via the bypass line 32. The control means 22, 22', 22'', 22''' are connected to the control unit 21 via signal connections 23, 23', 23'', 23'''.

The signal connections 23, 23', 23'', 23''' for connecting the control means 22, 22', 22'', 22''' and the control unit 21 and also a data connection 31 between an input unit 25 and the control unit 21 can transmit data in a wired or wireless manner, and therefore the signal connections 23, 23', 23'', 23''' and/or the data connection 31 can be designed, for example, as a radio connection, preferably as a short range radio connection, in particular as a Bluetooth radio connection. Furthermore, the signal connections 23, 23', 23'', 23''' and/or the data connection 31 can be designed as unidirectional and also bidirectional connections and can transmit control information and/or state information between the connecting partners. For example, in this case, the power and/or the temperature of at least one interior temperature-control system 6, 6', 6'' and/or of a control means 22, 22', 22'', 22''' can be transmitted to the input unit 25 which, for this purpose, comprises an output means (not illustrated) via which at least one item of control and/or state information can be output haptically, visually and/or acoustically.

The temperature-control circuit 4 is connectable to at least one temperature-control-medium storage system 10 via the control means 22 in such a manner that at least partial amounts of the temperature-control medium can be transferred at least temporarily from the temperature-control circuit 4 having at least one interior temperature-control system 6, 6', 6'' into the temperature-control-medium storage system 10 and/or from the temperature-control-medium storage system 10 into the temperature-control circuit 4 provided with at least one interior temperature-control system 6, 6', 6''. The control means 22 can be activated, as illustrated, on the basis of a control signal from the control system 21 transmitted via the signal connection 23. Alternatively or additionally, the control means 22 can be at least temporarily automatically controlled such that, for example, when the pressure in the temperature-control circuit 4 comprising at least one interior temperature-control system 6, 6', 6" is exceeded, the control means 22 automatically opens, and therefore the positive pressure can be dissipated by transferring temperature-control medium into the temperature-control-medium storage system 10.

The temperature-control-medium storage system 10 can have a first reservoir (not illustrated) for at least temporarily storing a first temperature-control medium and a second reservoir (not illustrated) for at least temporarily storing a second temperature-control medium which is different from the first temperature-control medium, preferably the first and/or the second temperature-control medium can be transferred specifically at least temporarily into the first reservoir, into the second reservoir and/or into the temperature-control circuit 4 via at least one control means (not illustrated) which can be activated by means of a control system 21.

The temperature of the temperature-control medium contained in the temperature-control circuit 4 can be controlled at least temporarily, in addition to the thermal energy of the source heat exchanger 5, via an, in particular electrically operated, temperature-control element 24, 24'. The temperature-control element 24, 24' can preferably be in direct contact with the temperature-control medium guided in the temperature-control circuit 4. According to FIG. 3, the temperature-control elements 24, 24' are arranged or formed at or in the floor temperature-control means 16, 16'.

At least one flow element can be arranged or formed in the temperature-control circuit 4, the flow element (not illustrated) at least temporarily changing the flow properties of the temperature-control medium at least in sections, in particular the flow element can be activated by means of a control system 21 in such a manner that a flow resistance and/or a manner of flow and/or a volumetric flow and/or a flow rate of the temperature-control medium guided in the temperature-control circuit 4 can be changed at least in sections.

The vehicle can optionally also have at least one first and one second temperature-control circuit 4, wherein the first and the second temperature-control circuit 4 are operatively connected at least temporarily to the same and/or to different interior temperature-control systems 6, 6', 6". At least one interior temperature-control system 6, 6', 6" can be connected to and/or disconnected from the first and/or the second temperature-control circuit 4 preferably via at least one control means 22, 22', 22", 22''' which can be activated by means of a control system 21.

The control system 21 can be at least temporarily connectable to an input unit 25, cf. FIG. 3. Temperature-control requirement information can be transmitted to the control system 21 via the input unit 25, and the control system 21 can generate and/or output a control signal, which is dependent on or corresponds to the temperature-control requirement information, for activating the temperature-control system 2, in particular for activating the source temperature-control system 5 and/or for activating at least one control means 22, 22', 22", 22''' of the temperature-control circuit 4.

In addition to the temperature-control circuit 4 guiding the temperature-control medium, the interior 3 of the vehicle 1 can additionally comprise at least one electrically operated or operable radiant heating means 26, wherein the predominant portion of the heat output of the radiant heating means 26 takes place, in particular by infrared rays, in the form of heat radiation into the interior 3 of the vehicle 1. By way of example, a radiant heating means 26 is arranged or formed in FIG. 3 on that side of the backrest of the vehicle seat 13 that faces counter to the direction of travel, wherein the heat radiation takes place in the direction of the arrow 27 to an interior region, preferably seat region, positioned behind the vehicle seat 13 provided with the radiant heating means 26.

FIG. 3 shows by way of example a temperature-control circuit 4 comprising a valve means 28. The valve means 28 can be used to at least temporarily open and/or close the temperature-control circuit 4 to/from the environment. So that as little contamination as possible or no contamination can pass into the temperature-control circuit 4 via the valve means 28, it is advantageous to arrange or to form the valve means 28 in the region of the vehicle roof. Alternatively or additionally to the arrangement and/or formation of the valve means 28 in the region of the vehicle roof, the valve means 28 can have an air filter which can likewise prevent the penetration of contaminants into the temperature-control circuit 4 via the valve means 28.

In addition to the control of the temperature of the interior of the vehicle 1 and therefore in particular of the passenger cell, it can be provided that the temperature-control circuit 4 guiding the temperature-control medium can be connected at least temporarily to a temperature-control means 29, wherein the temperature-control means 29 controls the temperature of at least one vehicle component. The temperature-controlled vehicle component can be, for example, a drinks holder (not illustrated), a glove compartment (not illustrated), a vehicle control device (not illustrated) and/or an energy store 30. The temperature-control means 29 can control the temperature of, for example, an energy store 30, in the form of a rechargeable battery, of the vehicle 1. For example, the energy store 30 is designed as a high voltage store which preferably supplies an electric machine, used as a drive unit, of the vehicle 1 with electrical energy.

The vehicle 1 can be designed at least temporarily as a vehicle 1 which can be driven with an electric machine, in particular with an electric motor, preferably as a vehicle 1 which can be operated at least temporarily in an autonomous or semi-autonomous driving mode.

LIST OF REFERENCE SIGNS

1 Vehicle
2 Temperature-control system
3 Interior of 1
4 Temperature-control circuit
5 Source temperature-control system
6, 6', 6" Interior temperature-control system
7 Heating circuit
8 Cooling circuit
9 Transmission heat exchanger
10 Temperature-control-medium storage system
11 Connection
12, 12' Roof temperature-control means
13, 13' Vehicle seat
14, 14', 14", 14'" Seat temperature-control means
15 Floor section of 1
16, 16' Floor temperature-control means
17 Air conditioning device
18, 18' Air flow
19, 19', 19" Connecting line
20, 20' Air-conducting duct
20", 20'" Air flow
21 Control system
22, 22', 22", 22'" Control means
23, 23', 23", 23'" Signal connection
24, 24' Temperature-control element
25 Input unit
26 Radiant heating means
27 Arrow 28 Valve means
29 Temperature-control means
30 Energy store
31 Data connection
32 Bypass line

What is claimed is:

1. A vehicle, comprising:
a temperature-control system configured to control a temperature of an interior of the vehicle, the temperature-control system including
a temperature-control circuit,
a temperature-control medium guided in the temperature-control circuit,
a source temperature-control system operatively connectable or operatively connected to the temperature-control circuit, and being configured to thermally influence the temperature-control medium guided in the temperature-control circuit,
at least one interior temperature-control system is operatively connectable or operatively connected to the temperature-control circuit such that the temperature-control medium located in the temperature-control circuit is usable to change the temperature of the vehicle interior;
wherein
the at least one interior temperature-control system includes at least two interior temperature-control systems arranged in series in the temperature-control circuit, and
in a direction of flow of the temperature-control medium there is at least one of
a floor temperature-control arrangement arranged upstream of a roof temperature-control arrangement, a seat temperature-control arrangement and an interior trim temperature-control arrangement,
the roof temperature-control arrangement arranged upstream of the seat temperature-control and the interior trim temperature-control arrangement, and
the seat temperature-control arranged or formed upstream of the interior trim temperature-control arrangement.

2. The vehicle according to claim 1, wherein
the at least one interior temperature-control system includes as a roof temperature-control arrangement arranged in or at a roof of the vehicle.

3. The vehicle according to claim 2, wherein
the at least one interior temperature-control system includes a seat temperature-control arrangement arranged in or at a vehicle seat, and
a flow system is arranged in or at the vehicle seat such that thermal energy of the seat temperature-control arrangement is at least partially absorbed by an air flow moved by the flow system.

4. The vehicle according to claim 3, wherein
the at least one interior temperature-control system includes an interior trim temperature-control arrangement arranged or formed in or at an interior trim panel of the vehicle.

5. The vehicle according to claim 4, wherein
the at least one interior temperature-control system includes a floor temperature-control arrangement arranged or formed in or at a floor section of the vehicle.

6. The vehicle according to claim 5, wherein
the at least one interior temperature-control system includes at least one air conditioning device configured to at least temporarily control the temperature of an air conditioning air flow directed into the interior of the vehicle, and
at least one outlet opening of the air conditioning air flow is arranged in a region of a front vehicle seat.

7. The vehicle according to claim 1, wherein
at least one connecting line of the temperature-control circuit running at least one of to and from the at least one interior temperature-control system runs at least in sections in or at a vehicle component in at least one of a region of a body of the vehicle, in a space surrounded by a load-bearing portion of the vehicle body, and in an interior trim panel.

8. The vehicle according to claim 7, wherein
at least one connecting line of the temperature-control circuit includes a connecting line at least one of to and from a roof temperature-control arrangement that runs at least in sections through a vehicle pillar.

9. The vehicle according to claim 8, wherein
the vehicle pillar is an A, B or C pillar, and
the at least one interior temperature-control system is operatively connected to at least one air-conducting duct arranged or formed at least in sections in at least one of the A, B or C pillar such that thermal energy is transmittable between air guided in the air-conducting duct and the interior temperature-control system.

10. The vehicle according to claim 1, wherein
at least one of a sequence and an amount of flow of the temperature-control medium through the at least two interior temperature-control systems is changeable by at least one control device configured to be activated by a control system, and
at least one of the at least two interior temperature-control systems is uncouplable at least temporarily from the temperature-control circuit via a bypass line.

11. The vehicle according to claim 1, wherein
the temperature-control circuit is connected to at least one temperature-control-medium storage system such that at least a partial amount of the temperature-control medium is transferable at least temporarily between the temperature-control circuit and the temperature-control-medium storage system.

12. The vehicle according to claim 11, wherein
the temperature-control medium is a first temperature-control medium,
the temperature-control-medium storage system includes a first reservoir for at least temporarily storing the first temperature-control medium and a second reservoir for at least temporarily storing a second temperature-control medium which is different from the first temperature-control medium, and
at least one of the first temperature-control medium and the second temperature-control medium is transferable at least temporarily into at least one of the first reservoir, the second reservoir and the temperature-control circuit via at least one control device configured to be activated by a control system.

13. The vehicle according to claim 1, wherein
a temperature of the temperature-control medium contained in the temperature-control circuit is controllable, at least temporarily, by at least one electrically operated temperature-control element.

14. The vehicle according to claim 1, further comprising:
at least one flow element arranged or formed in the temperature-control circuit, the flow element being

19 configured to at least temporarily change flow properties of the temperature-control medium at least in sections, and the at least one flow element is configured to be activated by a control system such that at least one of a flow resistance, a manner of flow, a volumetric flow, and a flow rate of the temperature-control medium guided in the temperature-control circuit is changeable at least in sections.

15. The vehicle according to claim 1, wherein
the temperature-control circuit includes at least a first temperature-control circuit and a second temperature-control circuit, the first temperature-control circuit and the second temperature-control circuit are operatively connected and/or operatively connectable at least temporarily to at least one of the same and ones of the at least one interior temperature-control systems, and at least one of the at least one interior temperature-control systems is connected to and/or disconnected from at least one of the first temperature-control circuit and the second temperature-control circuit via at least one control device configured to be activated by a control system.

16. The vehicle according to claim 1, further comprising:
a control system; and
an input unit,
wherein the control system is configured to
receive temperature-control requirement information via the input unit, and
generate a control signal based on the temperature-control requirement information to activate at least one control device of at least one of the temperature-control circuit and the source temperature-control system.

17. The vehicle according to claim 1, further comprising:
at least one electrically operated or operable radiant heater configured to output heat in the form of heat radiation into the interior of the vehicle.

18. The vehicle according to claim 1, wherein
the temperature-control circuit includes at least one valve arrangement configured to at least temporarily at least one of open and close the temperature-control circuit to the environment, and
the at least one valve arrangement is arranged or formed in a region of a roof of the vehicle.

19. The vehicle according to claim 1, wherein
the temperature-control circuit guiding the temperature-control medium is connectable at least temporarily to a temperature-control device, and
the temperature-control device is configured to control a temperature of at least one of a vehicle control device, a drinks holder, a glove compartment and an energy store.

20. The vehicle according to claim 1, wherein
the vehicle is configured to be driven at least temporarily by an electric motor.

21. The vehicle according to claim 1, wherein
the vehicle is operatable at least temporarily in an autonomous or partially autonomous driving mode.

22. The vehicle according to claim 1, further comprising:
a gas reservoir of the vehicle configured supply a gas to close the temperature control circuit to an exterior environment of the vehicle,
wherein
the at least one vent valve is arranged in or at a region of the roof temperature-control arrangement,

20 the at least one vent valve is configured to allow gas from the external environment to enter the roof temperature-control arrangement when the temperature-control medium is removed from the roof temperature-control arrangement.

23. The vehicle according to claim 1, further comprising:
at least one vent valve configured to open and close the temperature control circuit to allow a gas from an exterior environment of the vehicle to enter the vehicle,
wherein
the at least one vent valve is arranged in or at a region of the roof temperature-control arrangement,
the at least one vent valve is configured to allow gas from the external environment to enter the roof temperature-control arrangement when the temperature-control medium is removed from the roof temperature-control arrangement.

24. A temperature-control system for a vehicle, comprising:
a temperature-control circuit configured to control a temperature of an interior of the vehicle,
a temperature-control medium guided in the temperature-control circuit,
a source temperature-control system operatively connectable or operatively connected to the temperature-control circuit, and being configured to thermally influence the temperature-control medium guided in the temperature-control circuit,
at least one interior temperature-control system is operatively connectable or operatively connected to the temperature-control circuit such that the temperature-control medium located in the temperature-control circuit is usable to change the temperature of the vehicle interior,
wherein
the at least one interior temperature-control system includes at least two interior temperature-control systems arranged in series in the temperature-control circuit, and
in a direction of flow of the temperature-control medium there is at least one of
a floor temperature-control arrangement arranged upstream of a roof temperature-control arrangement, a seat temperature-control arrangement and an interior trim temperature-control arrangement,
the roof temperature-control arrangement arranged upstream of the seat temperature-control and the interior trim temperature-control arrangement, and
the seat temperature-control arranged or formed upstream of the interior trim temperature-control arrangement.

25. A method for controlling a temperature of an interior of a vehicle having a temperature-control system which includes
a temperature-control circuit, a temperature-control medium guided in the temperature-control circuit,
a source temperature-control system operatively connectable or operatively connected to the temperature-control circuit, and being configured to thermally influence the temperature-control medium guided in the temperature-control circuit, and
at least one interior temperature-control system operatively connectable or operatively connected to the temperature-control circuit such that the temperature-control medium located in the temperature-control circuit is usable to change the temperature of the vehicle interior, wherein
- the at least one interior temperature-control system includes at least two interior temperature-control systems arranged in series in the temperature-control circuit, and
- in a direction of flow of the temperature-control medium there is at least one of
  - a floor temperature-control arrangement arranged upstream of a roof temperature-control arrangement, a seat temperature-control arrangement and an interior trim temperature-control arrangement,
  - the roof temperature-control arrangement arranged upstream of the seat temperature-control and the interior trim temperature-control arrangement, and
  - the seat temperature-control arranged or formed upstream of the interior trim temperature-control arrangement the method comprising the acts of:

controlling an amount of thermal energy exchanged between the source temperature-control system, the temperature-control circuit and the at least one interior temperature-control system to control the temperature of the interior of a vehicle to a predetermined temperature.

26. The method according to claim 25, further comprising the acts of:
- initiating removal of the temperature-control medium from the roof temperature-control arrangement in response to a determination that absorption of thermal energy from an exterior environment of the vehicle by the roof temperature-control arrangement is to be minimized; and
- initiating entry of a gas into the roof temperature-control arrangement while the temperature-control medium is being removed from the roof temperature-control arrangement.

27. The method according to claim 26, wherein
the gas entering into the roof temperature-control arrangement is from a gas reservoir of the vehicle.

28. The method according to claim 26, wherein
the vehicle temperature-control system includes at least one vent valve arranged in or at a region of the roof temperature-control arrangement, and
the gas entering into the roof temperature-control arrangement enters the roof temperature-control arrangement through the at least one vent valve.

* * * * *